United States Patent Office 3,077,276
Patented Feb. 12, 1963

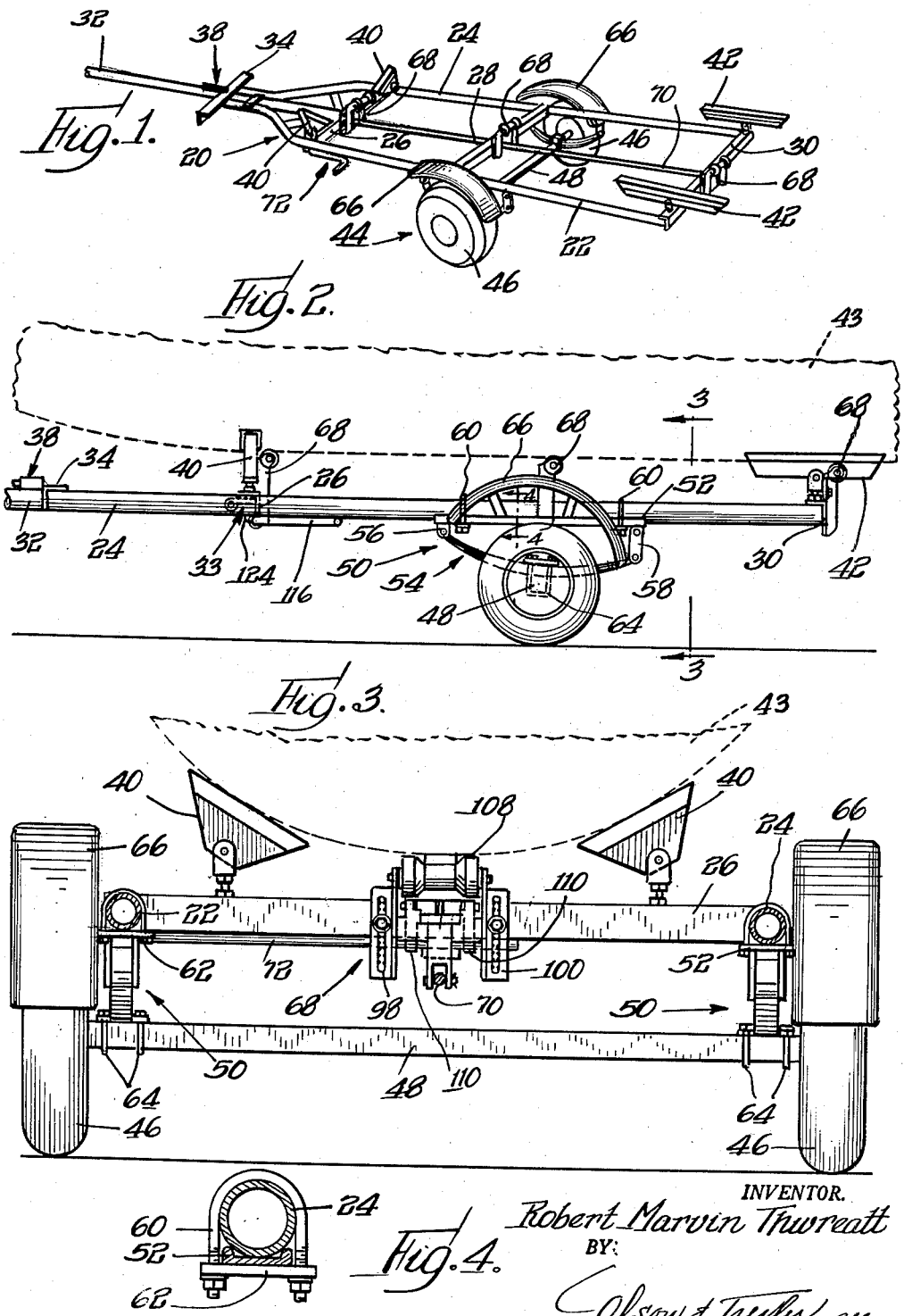

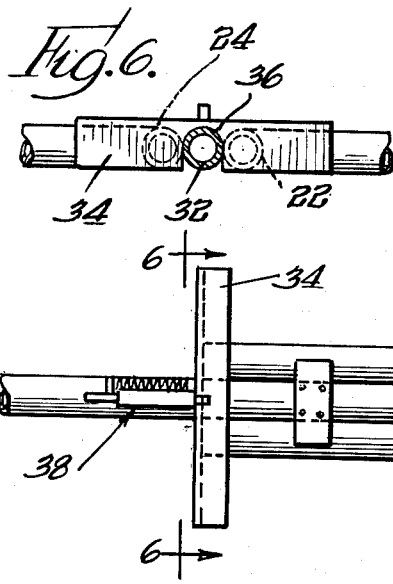
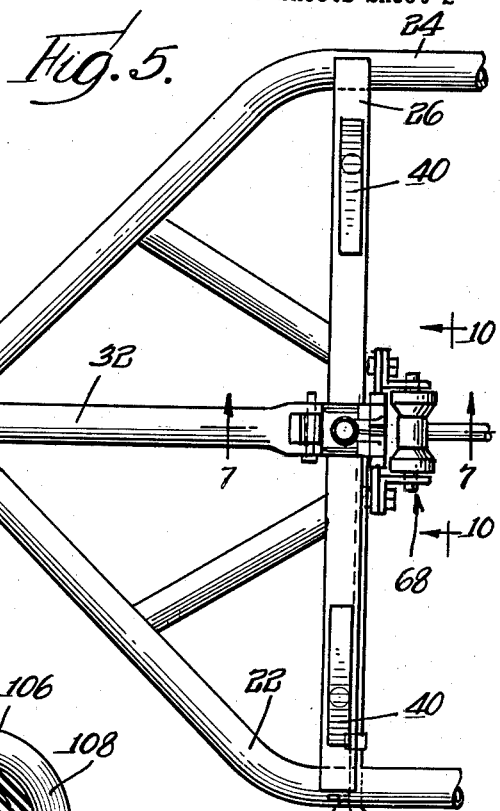
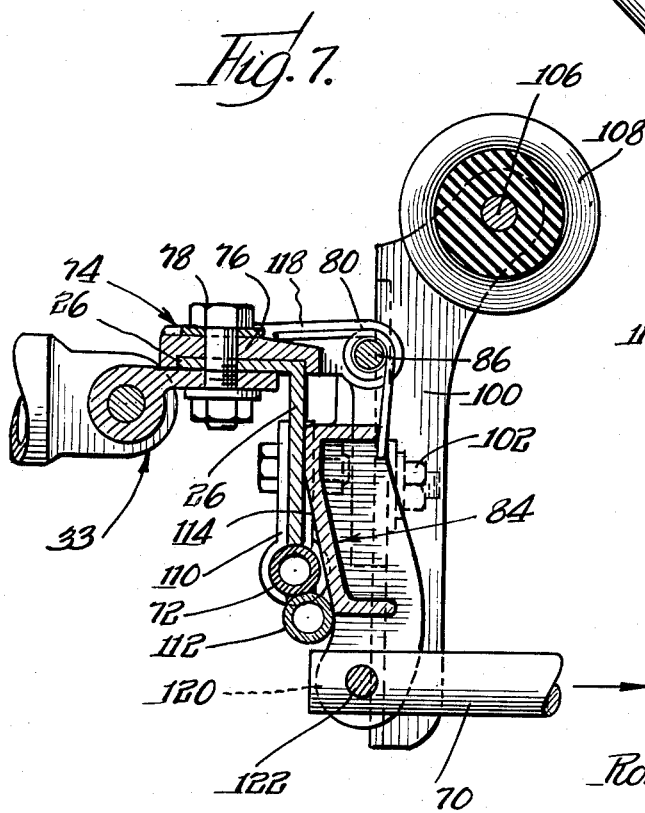
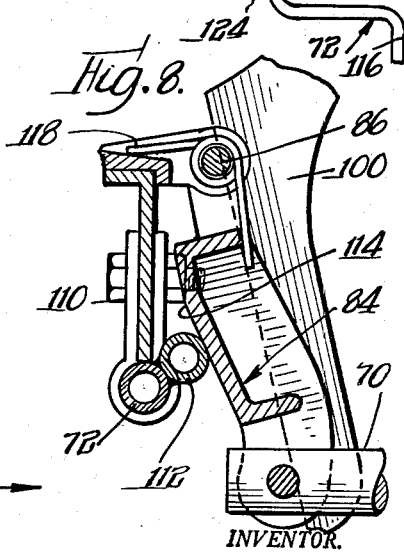

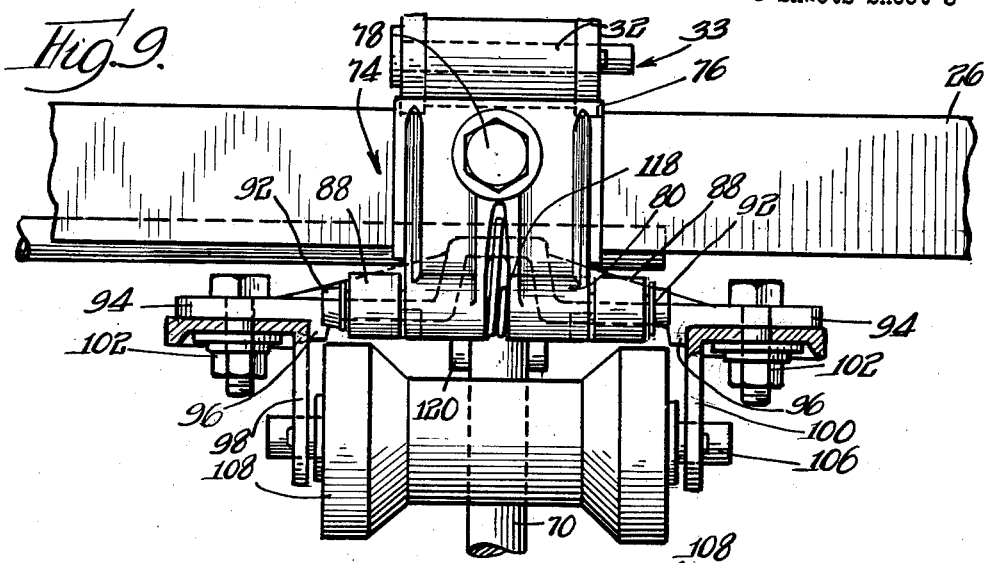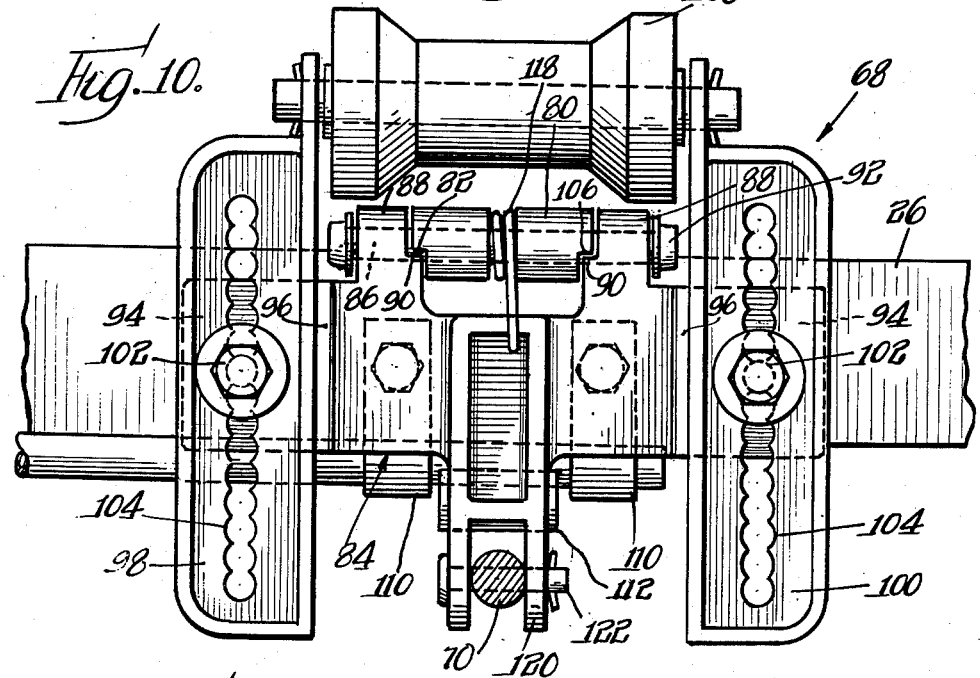

3,077,276
BOAT TRAILER
Robert Marvin Thwreatt, Mount Prospect, Ill., assignor to Aberdeen Welding Service Inc., Chicago, Ill., a corporation of Illinois
Filed Dec. 21, 1959, Ser. No. 860,908
6 Claims. (Cl. 214—84)

This invention relates generally to trailers for transporting small boats and more particularly to boat trailers that incorporate boat launching and loading apparatus.

Boat trailers intended to be towed by a passenger car are known, and numerous forms presenting a variety of useful features have been devised. Nonetheless, considerable skill, dexterity and physical strength are required in loading or launching a boat from one of these prior art trailers. Furthermore, the small boat trailers heretofore known and used are susceptible of damage to the boat particularly during its transportation.

Therefore, an important object of the present invention is to provide a new and improved boat trailer which overcomes the limitations of the prior art by manifesting great ease and simplicity in loading and launching the boat.

Another object of the invention is to provide a boat trailer that does not tend to incur damage of the boat during loading, launching or transporting.

Yet another object of the invention is to provide a boat trailer which positively supports the boat in a level condition during transportation.

A further object of the invention is to provide a boat trailer which is easy and safe to use.

A still further object of the invention is to provide a boat trailer which is readily and positively adaptable to boats of different size and shape.

A yet further object of the invention is to provide a boat trailer which is characterized by being quiet and substantially free of rattles during transportation.

Additional objects and features of the invention pertain to the particular structure and arrangements whereby the above objects are attained.

A structure in accord with the invention includes a frame having a plurality of transverse struts, cradle means affixed to the frame including laterally pivotal bow cradle members and longitudinally pivotal stern cradle members, a plurality of keel-engaging roller assemblies vertically pivotally mounted individually to the struts along the longitudinal axis of the frame in order to be disposable in unison into a boat-bearing position wherein the boat is free of the cradle means and into a retracted position wherein the boat rest exclusively on the cradle means, rod means mechanically connecting the roller assemblies in series, cam means operably engaging a cam surface on one of the roller assemblies for directing the assemblies into the boat bearing position and for releasing the assemblies into the retracted position, and control means including a crank arm for operating the cam means.

The invention, both to its structure and mode of operation, will be better understood by reference to the following disclosure and drawings forming a part thereof, wherein:

FIG. 1 is a perspective view of a boat trailer constructed in accordance with the invention;

FIG. 2 is a somewhat enlarged, side-elevational view of the boat trailer of FIG. 1;

FIG. 3 is a further enlarged view taken through the section 3—3 of FIG. 2;

FIG. 4 is an enlarged view taken through the section 4—4 of FIG. 2, showing the means for adjustably mounting the wheeled supports to the frame of the boat trailer of the invention;

FIG. 5 is an enlarged, fragmentary, plan view of the bow portion of the boat trailer of FIG. 1;

FIG. 6 is a view taken through the section 6—6 of FIG. 5;

FIG. 7 is an enlarged view taken through the section 7—7 of FIG. 5, showing the roller assembly in the retracted position;

FIG. 8 is a view similar to the showing of FIG. 7, illustrating the roller assembly in the boat-bearing position;

FIG. 9 is an enlarged, plan view of the roller assembly of FIG. 7;

FIG. 10 is another view of the roller-supporting assembly of the invention taken through the section 10—10 of FIG. 5; and FIG. 11 is a perspective view of the crank arm assembly employed in the embodiment of FIG. 1.

Referring now in detail to the drawings wherein a single embodiment of the invention is illustrated, with particular regard to FIG. 1, a boat trailer will be seen to include a frame 20 having tubular side members 22 and 24. Spaced-apart, transverse struts 26, 28 and 30 are suitably connected to side members 22 and 24 as by welding.

A tongue member 32 is pivotally and hingeably fastened to the strut 26; and as is best shown in FIG. 2, a connecting unit 33 is employed for this purpose. The side members 22 and 24 are forwardly shaped in yoke fashion to receive tongue 32 therebetween. Advantageously, an angle bracket 34 is secured across the front ends of side members 22 and 24, bracket 34 being provided with a downwardly opening notch 36 for receiving and positionally restraining tongue 32, as is best shown in FIGS. 5 and 6. In order to secure tongue 32 in notch 36, a latch member 38 is mounted to tongue 32 extending a spring-biased latch bolt into engagement with an apertured strike secured to bracket 34.

To the strut 26, a pair of bow cradle members 40 is laterally pivotally mounted in spaced-apart relationship. The spaced-apart and pivotal nature of the bow cradle members 40 allow the boat trailer of the invention to accommodate boats of different size and shape.

To the strut 30, a pair of stern cradle members 42 is longitudinally pivotally mounted in spaced-apart relationship. Cradle members 40 and 42 are upholstered on their upper surfaces or otherwise arranged for cushioned support of a boat 43.

The framework 20 is provided with a wheeled support generally indicated at 44, support 44 comprising demountable, rubber-tired wheels 46 rotatably mounted to and interconnected by a solid bar axle 48. Frame 20 is supported on the axle 48 by means of the spring assemblies 50, as is best shown in FIGS. 2 and 3.

Each of the spring assemblies 50 includes a channel member 52 which supportingly receives the corresponding side member of the frame 20. Leaf spring units 54 are mounted beneath the channel member 52 by a bracket 56 and a link 58. U-bolts 60 pass through plates 62 to engage cooperating nuts in order to secure the channel members 52 to the corresponding side members of frame 20. Similarly, U-bolts 64 are employed in mounting the axle 48 to the leaf spring units 54. Fenders 66 are advantageously secured to the channel members 52 as by appropriately welded brackets.

As will become apparent, the construction and arrangement of the wheeled support 44 is permissive of longitudinal positioning of the support relative to the frame 20; and it has been found to be desirable to position the support 44 substantially beneath the center of gravity of the boat in its transporting condition. As will be recognized, outboard motors, boating accoutrements and other sundries stowed in the boat during transportation may affect the center of gravity of the loaded boat and, accordingly, the positioning of wheeled support 44.

In accordance with an important feature of the invention, two or more keel-engaging anti-friction assemblies 68 are mounted along the longitudinal axis of frame 20. Advantageously, the assemblies 68 are mounted respectively to the struts 26, 28 and 30, being arranged for vertically pivotal, co-ordinated movement.

In the illustrated embodiment, the assemblies 68 are mechanically connected in series by being pivotally mounted to a rod 70. In addition, a crank arm unit 72 is appropriately arranged for operating the anti-friction assemblies into a boat-bearing position wherein the boat 43 is free of the cradles 40 and 42 and into a retracted position wherein the boat rests exclusively on the cradles.

Turning now to FIGS. 7–11 for a more detailed description of the construction and arrangement of assemblies 68, of rod 70 and of crank arm unit 72, it will be seen that an anti-friction assembly 68 includes a mounting plate 74 having a channeled portion 76 which receives the upper portion of strut 26 in non-rotatable relationship. A bolt 78 advantageously fastens the channeled portion 76 to the strut 26. Mounting plate 74 also includes a hollow barrel portion 80 which is provided with axially disposed shoulders or stops 82 incorporated at its opposite ends, as best shown in FIG. 10.

An intermediate plate 84 is hingedly connected to the mounting plate 74 by an axle 86 which extends through the barrel portion 80 and through spaced-apart, coaxial, cylindrical bearing portions 88. The bearing portions 88 are provided with shoulders or stops 90 which cooperate with the stops 82 in limiting the upward rotation of intermediate plate 84. Abutment of the stops 90 with the stops 82 defines the boat-bearing position of the anti-friction assemblies 68, as will be described more fully hereinbelow. Axle 86 is positively positioned relative to the barrel portion 80 and the bearings 88 by means of press-fit end caps 92 or other suitable means.

Intermediate plate 84 is also fabricated with side portions 94 and spaced-apart, vertical holder ribs 96. A pair of angled support brackets, brackets 98 and 100, are advantageously affixed to the portions 94 by bolts 102, ribs 96 engaging edges of the brackets 98 and 100 so as effectively to prevent rotation or cocking of the brackets.

In accordance with a feature of the invention, the support brackets 98 and 100 incorporate scalloped slots 104 which are adapted to receive the shanks of bolts 102 in discrete positions. The slots 104 are arranged to be of such a length as to provide adequate vertical adjustment of the brackets 98 and 100, whereas the scalloped nature of the slots 104 prevents any looseness in the fastening of the bolts 102 from incurring slippage of the brackets 98 and 100, safety during loading and launching being thereby ensured.

A shaft 106 extends between the upper ends of brackets 98 and 100, and a dumbbell-shaped, keel-engaging roller 108 is rotatably mounted to the shaft 106 between the confines established by brackets 98 and 100. Shaft 106 may be pinned or otherwise suitably arranged to prevent axial movement.

With particular reference to FIGS. 3, 7 and 11, the crank arm unit 72 is shown rotatably mounted to the strut 26 by means of bearing brackets 110. Two of the brackets 110 are appropriately spaced on either side of a cam 112 which is secured to the crank arm 72 to engage a cam surface 114 on intermediate plate 84. Other bearing brackets 110 may be disposed at suitable locations.

As will be recognized, operation of the handle portion 116 of the crank arm unit 72 will drive cam 112 into opposition with cam surface 114 whereby pivoting of the roller 108 about the axle 86 will result in a general elevation of the roller.

Advantageously, the barrel portion 80 is centrally peripherally slotted to accommodate a torsion spring 118 in order to bias plate 84 generally into contact with the vertical portion of strut 26. Thus, when cam 112 is out of opposition with cam surface 114, bracket 84 is held against strut 26 so as to prevent rattling, especially during transportation of the trailer.

In order that elevation of each of the rollers 108 associated with the several anti-friction assemblies 68 may be incurred in unison by the rotation of the single cam 112, the intermediate plates 84 are provided with depending, generally U-shaped brackets 120 within which the rod 70 is pivotally mounted as by a pinned stud 122.

As is best shown in FIGS. 5 and 11, a stop 124 is secured to crank arm 72, as by welding, in order to confront side member 22 and restrict the downward movement of handle 116.

Having thus described one construction of the invention, it is important now to state how the illustrated embodiment operates. Assuming that a boat has been brought to shore for loading on the boat trailer of the invention, loading may proceed in the following manner:

The trailer itself is first readied for loading by grasping the handle 116 and turning it in a generally counterclockwise direction toward the front end of the tongue 32. A quarter turn of handle 116 will rotate the cam 112 from the position shown generally in FIG. 7 to that shown generally in FIG. 8. This rotation of cam 112 will result in a pivoting of the plate 84 about the axle 86 in opposition to the force of spring 118; and an elevation of roller 108 will thereby be incurred. By virtue of the interconnection of the several roller assemblies 68 through the rod 70, this rotation of the cam 112 will cause an elevation of the several rollers 108 in unison.

Assuming that all the brackets 98 and 100 have been properly positioned for the boat which it is desired to load, this elevation of the rollers 108 will be sufficient so that when the boat is resting uniformly on the several rollers it will be disposed completely out of contact with the cradles 40 and 42. Thus, loading and launching of the boat are greatly facilitated.

As will be recognized, the 90 degree rotations of handle 116 occur between the limits established by stop 124 confronting side member 22 and by engagement of the stops 82 and 90, these limits being associated respectively with the configuration of FIG. 7 and that of FIG. 8.

It is important to point out that when cam 112 is disposed as shown in FIG. 8, cam 112 is overcentered relative to crank arm 72. Accordingly, any weight impressed upon the rollers does not tend to return the cam to the position indicated generally in FIG. 7. Accidental, dropping of the boat during loading or launching is thereby prevented.

With the rollers 108 properly upraised, the boat trailer may then be rolled into position relative to the boat by manually manipulating the trailer as by the tongue 32. It will be noted that, this manipulation of the trailer may be facilitated by releasing the latch 38 so that the trailer frame 20 may be jack-knifed or pivoted relative to the tongue 32. Bracket 34 may also be grasped and employed in conjunction with the pivoting of tongue 32 in directing the trailer into position relative to the boat.

When the trailer is in position, the boat may then be drawn or pulled onto the trailer with the keel of the boat engaging the rollers 108. Advantageously, a winch separately provided or incorporated on the tongue 32 may be employed in this drawing of the boat up onto the trailer. During this loading operation, the boat is intended to ride exclusively on the rollers 108, completely out of contact with the cradles 40 and 42. As will be recognized, only slight manual direction of the boat is necessary in keeping it in such a disposition.

With the boat properly positioned on the trailer, the handle 116 may be rotated in a clockwise direction wherein the rollers are retracted and the boat gradually settled into wedged engagement on the cradles 40 and 42. It is to be recognized that the pivotal nature of the cradles 40 and 42 facilitates receiving the boat in the proper wedged engagement.

During retraction of the rollers, the cam 112 will ride down the cam surface 114, and the weight of the boat coupled with the comparatively slight force from the spring 118 will urge the surface 114 to follow the cam 112.

With the boat wedged into the cradles 40 and 42, the boating gear may be stowed aboard the boat and the wheeled support 44 appropriately adjusted longitudinally relative the trailer frame 20. U-bolts 60 may be loosened and the support 44 slidably arranged to balance the boat and the boating accoutrements properly. The bolts 60 may then be tightened for transportation.

During transportation, it is to be noted, the boat rests in a substantially level position, as shown in FIG. 2, being supported entirely on members fixed to the frame, specifically the cradles 40 and 42, there being no support from hingedly fastened or rotatable fixtures. This arrangement effectively precludes damage to the boat during its transportation. During transportation, the springs 118 urge the corresponding plates 84 against the respective struts in order to prevent rattles and to provide a comparatively noiseless ride.

Unloading the boat will take the reverse sequence wherein the crank arm 72 is turned counterclockwise to lift the boat off the cradles 40 and 42 into exclusive contact with the rollers 108. With the boat contacting only the rollers 108, only slight force is necessary to launch the boat from the trailer.

Furthermore, it is important to note, the boat trailer of the invention may be operated in shallow water whereby the buoyancy effects may assist in drawing the boat up upon the rollers for loading or in shoving the boat off of the rollers for launching.

The specific example herein shown and described is intended to be illustrative only. Various changes in structure will, no doubt, occur to those skilled in the art; and these changes are to be understood as forming a part of this invention insofar as they fall within the spirit and scope of the appended claims.

The invention is claimed as follows:

1. A boat trailer comprising: a frame; a plurality of cradle means affixed to said frame, at least one of said cradle means being situated in each quadrant of said frame; a plurality of keel-engaging anti-friction assemblies vertically pivotally arranged along the longitudinal axis of said frame to be disposable in unison into a boat-bearing position wherein the boat is free of said cradle means and into a retracted position wherein said boat rests exclusively on said cradle means; means mechanically connecting said assemblies in series; and control means, including a crank shaft and a cam on said crank shaft operably engaging a generally vertical cam surface on one of said antifriction assemblies, said control means operating to elevate the assemblies into boat-bearing position and to release the assemblies into the retracted position with rotation of said crank shaft to elevate the assemblies acting to over-center said cam whereby to positively secure the said assemblies in the boat-bearing position.

2. A boat trailer comprising: a frame including a plurality of transverse struts; a plurality of cradle means affixed to said frame, at least one of said cradle means being situated in each quadrant of said frame, said plurality of cradle means including laterally pivotal bow cradle members and longitudinally pivotal stern cradle members; a plurality of keel-engaging roller assemblies vertically pivotally mounted individually to said struts on the longitudinal axis of said frame to be disposable in unison into a boat-bearing position wherein the boat is free of said cradle means and into a retracted position wherein said boat rests exclusively on said cradle means; rod means mechanically connecting said assemblies in series; and control means, including a cam operably engaging a cam surface on one of said assemblies, for directing said assemblies into said boat-bearing position and for releasing said assemblies into said retracted position, said cam overcentering when said assemblies are in said boat-bearing position.

3. A boat trailer comprising: a frame including a plurality of transverse struts; a plurality of cradle means affixed to said frame, at least one said cradle means being situated in each quadrant of said frame, said plurality of cradle means including laterally pivotal bow cradle members and longitudinally pivotal stern cradle members; a plurality of keel-engaging roller assemblies vertically pivotally mounted individually to said struts on the longitudinal axis of said frame to be disposable in unison into a boat-bearing position wherein the boat is free of said cradle means and into a retracted position wherein said boat rests exclusively on said cradle means; rod means mechanically connecting said assemblies in series; means biasing said assemblies against said struts in said retracted position; and control means, including a cam operably engaging a cam surface on one of said assemblies, for directing said assemblies into said boat-bearing position and for releasing said assemblies into said retracted position, said control means further including crank arm means for operating said cam means, said crank arm means including a stop confrontable with a portion of said frame when said assemblies are in said retracted position.

4. In boat trailers constructed with a framework having transverse struts, the combination comprising: a mounting plate adapted to be non-rotatably mounted to a said strut and having a hollow barrel portion including axially disposed stops at each end; an axle extending through said barrel porton; an intermediate plate having spaced-apart, coaxial, cylindrical bearing portions rotatably mounted on said axle beyond the ends of said barrel porton, said bearing portions including stops cooperating with the stops of said barrel portion in limiting the upward rotation of said intermediate plate; a pair of angled support brackets adjustably mountable on said intermediate plate in non-cocking relationship; and keel-engaging roller means rotatably mounted between said support brackets at the upper ends thereof.

5. In boat trailers constructed with a framework having transverse struts, the combination comprising: a mounting plate adapted to be non-rotatably mounted to a said strut; an intermediate plate hingedly mounted to said mounting plate and having side portions defined by spaced-apart, vertical holder ribs; a pair of angled support brackets positively adjustably positionable on said side portions and in engagement with said holder ribs which serve to prevent cocking or rotation of said brackets, said support brackets having scalloped, bolt-receiving slots for use in securing said support brackets to said intermediate plate in fixed positions of vertical adjustment; and keel-engaging roller means rotatably mounted between said support brackets at the upper ends thereof.

6. In boat trailers constructed with a framework having transverse struts, the combination comprising: a mounting plate having a channeled portion for non-rotatable attachment to a said strut and having a hollow barrel portion including axially disposed stops at each end; an axle extending through said barrel portion; an intermediate plate having spaced-apart, coaxial, cylindrical bearing portions rotatably mounted on said axle beyond the ends of said barrel portion, said bearing portions including stops cooperating with the stops of said barrel portion in limiting the upward rotation of said intermediate plate, said intermediate plate further having a cam surface, depending pivot means for a coupling rod and side portions defined by spaced-apart, vertical holder ribs; a pair of right-angled support brackets adjustably positionable on said side portions by means of bolts passing through scalloped, vertical slots formed in said support brackets, said support brackets being non-rotatable relative to said intermediate plate by virtue of cooperation with said holder ribs; and keel-engaging roller means rotatably mounted between said support brackets above said axle.

References Cited in the file of this patent

UNITED STATES PATENTS

| | | |
|---|---|---|
| 1,941,400 | Johnson | Dec. 26, 1933 |
| 2,586,485 | Schroeder | Feb. 19, 1952 |
| 2,700,480 | Triplett | Jan. 25, 1955 |
| 2,733,823 | Evans | Feb. 7, 1956 |
| 2,788,908 | Lynd | Apr. 16, 1957 |
| 2,805,786 | Green | Sept. 10, 1957 |
| 2,840,252 | Weber | June 24, 1958 |
| 2,848,126 | Taylor | Aug. 19, 1958 |
| 2,865,522 | Peterson et al. | Dec. 23, 1958 |
| 2,889,945 | Holsclaw | June 9, 1959 |
| 2,960,246 | Lovelace | Nov. 15, 1960 |